United States Patent [19]
Shaw et al.

[11] Patent Number: 5,745,598
[45] Date of Patent: Apr. 28, 1998

[54] STATISTICS BASED SEGMENTATION AND PARAMETERIZATION METHOD FOR DYNAMIC PROCESSING, IDENTIFICATION, AND VERIFICATION OF BINARY CONTOUR IMAGE

[76] Inventors: Venson Ming Heng Shaw, 111 Reldyes Ave., Leonia, N.J. 07605; Andrzej Stefan Sluzek, Nanyang Technological University, School of Applied Science Nanyang Avenue, Singapore, Singapore, 2263

[21] Appl. No.: 208,992

[22] Filed: Mar. 11, 1994

[51] Int. Cl.$^6$ .............................. G06K 9/62; G06K 9/34; G06K 9/00
[52] U.S. Cl. .......................... 382/209; 382/119; 382/179; 382/187; 382/201
[58] Field of Search .................................... 382/13, 3, 16, 382/19, 23, 25, 9, 173, 179, 186–188, 190, 195, 201, 119, 123, 209, 215

[56] References Cited

U.S. PATENT DOCUMENTS

| | | | |
|---|---|---|---|
| 4,607,386 | 8/1986 | Morita et al. | 382/23 |
| 5,111,512 | 5/1992 | Fan et al. | 382/3 |
| 5,150,420 | 9/1992 | Haraguchi | 382/3 |

FOREIGN PATENT DOCUMENTS

| | | | |
|---|---|---|---|
| 0079483 | 5/1985 | Japan | 382/13 |

OTHER PUBLICATIONS

"Feature Extraction Capability of Some Discrete Transforms", Wu et al. 1991 IEEE Int'l Symposium on Circuits and Systems pp. 2649–2652, vol. 5, 1991.

*Primary Examiner*—Leo Boudreau
*Assistant Examiner*—Bhavesh Mehta

[57] ABSTRACT

An improved method of segmentation and feature-based description for verification/authentication of contour images (e.g. handwritten signatures) is described, directed to a system which employs a set of parameters extracted from a dynamic description of a contour image template to perform segmentation of incoming contour images being verified/authenticated by the system. The preferred embodiment would consist of a central processing unit incorporating a high-performance computer, and of many autonomous verification units (e.g. ATM machines) equipped with inexpensive processing devices. In the central processing unit, a contour image template is segmented into strokes according to the segmentation parameters which are computed using selective properties of the mathematical transformation for said contour image template. For illustration purpose, a discrete cosine transform (DCT) is being used. The segmentation parameters, selective global parameters of the contour image, and selective features of the extracted strokes are memorized in a portable memory device. In a verification unit, an incoming contour image is normalized according to the global parameters retrieved from the portable memory device, then the incoming contour image is segmented according to the retrieved segmentation parameters, and finally the selective features are computed for the extracted strokes. The incoming contour image is accepted if the computed features and the corresponding features retrieved from the portable memory device satisfies a predetermined similarity criterion.

5 Claims, 6 Drawing Sheets

STATISTICS BASED SEGMENTATION AND PARAMETERIZATION METHOD FOR DYNAMIC PROCESSING, IDENTIFICATION, AND VERIFICATION OF BINARY CONTOUR IMAGE

This is a substitution of specification for the application Ser. No. 08/208,992, filed Mar. 11, 1994.

BACKGROUND OF THE INVENTION

1. Field of the Invention

The present invention is directed in general to a system for verification/authentication of contour images, and more particularly to a system which employs a set of parameters extracted from a dynamic description of a contour image template to perform segmentation of incoming contour images being verified/authenticated by the system.

2. Description of the Background Art

Some of the existing systems for automatic recognition (verification, authentication) of contour images (e.g. personal signatures, handwritten characters, etc.) utilize the dynamic description of contour images, where both the position (horizontal and vertical coordinates) and the motion (temporal coordinates) of the tip a drawing device (stylus) are sensed and memorized.

The dynamic description of contour images can significantly simplify the identification/authentication algorithms, and therefore it is particularly popular in the analysis of continuous handwriting, and in the automatic verification/ authentication of personal signatures, which is one of the most prospective areas of application (e.g. for computerized banking, security, charge card transactions, etc.). The dynamic description of contour images have been addressed by numerous practitioners including, for example, U.S. Pat. No. 5,111,512, issued to Fan, et al. on May 5, 1992, U.S. Pat. No. 4,607,386, issued to Morita et al. on Aug. 19, 1986. However, the proposed approach requires independent segmentation algorithms for the authentication process which might be prohibitively expensive.

The signature verification/authentication systems typically consists of many autonomous verification units (e.g. ATM machines, security check points) which have only limited access or no access at all to the central unit (e.g. the mainframe computer of a banking system). Therefore, the algorithms for such systems must be simple enough to be performed by inexpensive processing devices incorporated in the verification units. Moreover, the verification units would not have any database containing signature templates for all the eligible customers. Thus, for any signature to be verified/authenticated, a description of the corresponding template must be furnished by the customer. This can be achieved using existing systems of magnetic cards or similar portable memory devices. For example, U.S. Pat. No. 5,150, 420, issued to Haraguchi on Sep. 22, 1992, discloses the use of a portable card system for visual verification of signatures. However, such approach may require extensive memory capacity due to the requirement for storing the entire physical data of the template. On the other hand, it is important to point out that the majority of existing autonomous verification units are only equipped to handle magnetic portable memory devices (e.g. magnetic cards) which have limited memory capacity which sets the stringent requirements.

The existing algorithms of signature identification/ authentication usually utilize feature-based descriptions of signatures, i.e. signatures are represented by a sequence of values characterizing their selective properties. The approach can be either a global one (i.e. the features describe properties of the whole signature) or a local one (i.e. a signature is first segmented into strokes, and then the features describing extracted strokes are created). Both approaches reveal certain disadvantages. The global approach (e.g. based on neural networks) requires experimentation of many templates of each signature before a reliable feature-based description of the signature template can be created, which becomes quite cumbersome for customers. The local approach requires segmentation algorithms equally made available at the verification units. Such algorithms are either too complex to incorporate in the verification units, or the accuracy of these algorithms becomes too limited. This is because a reliable segmentation requires complex mathematical operation of input signatures in order to determine the appropriate length and number of extracted strokes. Otherwise the results of segmentation would be very sensitive even to very minor deformations of analyzed signatures.

As a result, the present system methods to date impose severe limitations and significant disadvantages for practical implementation. It would therefore be highly desirable to further propose novel system method with particular technological innovations for the dynamic processing, verification and authentication of binary contour image. This will lead towards the improvement of the overall system operation efficiency and productivity for the computerized banking, security, charge card transaction, and/or related industries.

SUMMARY OF THE INVENTION

It is therefore an object of the present invention to provide a statistics based system method for verification/ authentication of selective binary contour images, and more particularly a system method which employs a set of parameters extracted from the dynamic description of a binary contour image template to perform segmentation of incoming binary contour images being verified/authenticated by the system It is further an object of the present invention to generalize said binary contour images for including signatures, handwritten texts and characters, and contours representing selective physical phenomena.

It is still further an object of the present invention to perform mathematical operation on the dynamic description of said binary contour image template, and to further perform segmentation of said image template according to selective properties.

It is still further an object of the present invention to generalize said mathematical operation for including selective transform operation, i.e. discrete cosine transform (DCT) on said binary contour image template.

It is still further an object of the present invention to represent results of said segmentation through computation and generation of a sequence of selective global parameters, segmentation parameters and feature measurements.

It is still further an object of the present invention to memorize into an external magnetic card or another portable memory device said sequence of parameters and features for future verification/authentication of said binary contour image template.

It is still further an object of the present invention to retrieve from said external magnetic card or portable memory device said sequence of parameters and features, wherein said parameters are for on-line normalization and segmentation of any incoming binary contour image, and furthermore said features are for on-line verification of any incoming binary contour image with said stored image template for authentication.

In the present invention appropriate means are provided for sampling binary contour images, creating their dynamic descriptions, and facilitating their storage in digital form. A preferred embodiment of the present invention consists of a central processing unit incorporating a high-performance computer, and of many autonomous verification units (e.g. ATM machines, security check points) equipped with inexpensive processing devices. The central processing unit acquires a binary contour image template from an input device (stylus). The image template is firstly segmented into strokes, and then the central processing unit generates a sequence of selective global parameters, segmentation parameters and features describing the whole template image and its strokes. Because of complex calculations, the process of segmentation should be performed on a computer of relatively high performance.

The global parameters (describing the whole contour image template) are:
- total length of the template contour image (number of contour pixels)
- standard deviations of horizontal and vertical coordinates of the contour image pixels.

The segmentation parameters (depending on the results of segmentation) are:
- number of extracted strokes;
- length and location of each extracted stroke within the sequence of contour pixels.

The segmentation parameters are computed using selective properties of the mathematical transformation for the dynamic representation of the contour image template. For illustration purpose, a discrete cosine transform (DCT) is being, proposed.

The generated features describe selective shape properties of extracted strokes. The detailed specification of the features is included into the description given hereinbelow.

The major improvement is that the parameters as well as the feature measurements of the contour image template can be easily memorized in a low cost traditional portable memory device (e.g. magnetic card). Therefore, in a verification unit, the segmentation of incoming contour images is performed using parameters retrieved from a magnetic card/ portable memory device. First, an incoming contour image is normalized according to the retrieved global parameters, and secondly the strokes are extracted so that their number, length and location correspond to the retrieved segmentation parameters. Then, the features calculated for the extracted strokes of the incoming contour image are compared to the features retrieved from a magnetic card/portable memory device. If the overall distance between the calculated features and the features retrieved from a magnetic card/ portable memory device satisfies a predetermined criterion, the incoming, contour image is accepted. Otherwise it is rejected.

BRIEF DESCRIPTION OF THE DRAWINGS

. The present invention will become more fully understood from detailed description given hereinbelow and the accompanying drawings which are given by way of illustration only, and thus are not limitative of the present invention and wherein.

DESCRIPTION OF THE PREFERRED EMBODIMENT

In the following description, particular reference is made to the implementation of the invention in the context of verifying/authenticating personal signatures represented by the dynamic description of binary contour images. It is envisaged, however, that the practical applications of the invention can be extended to many other areas in which selective physical phenomena would be represented by the dynamic description of binary contour images.

In the following description, the expressions "signatures", "signature template", "incoming signatures", etc. are used, but it is understood that any other binary contour images of a similar nature can be involved instead.

Figure 1:
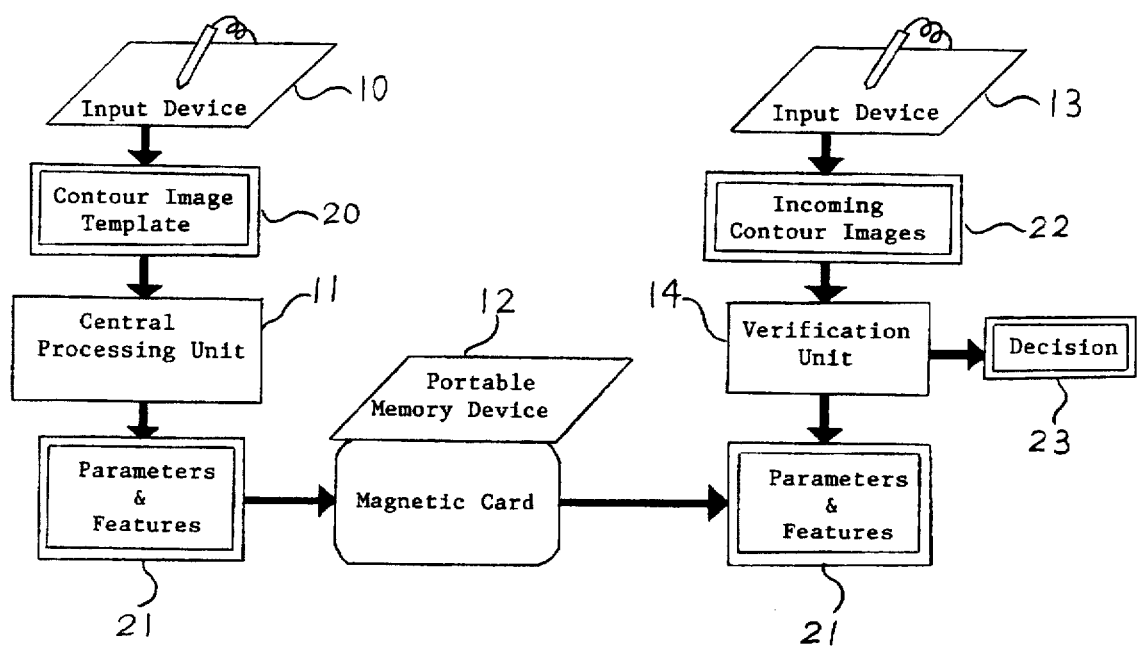
FIG. 1 is a general block diagram illustrating major components and data flow in a preferred embodiment of the present invention.

Referring to FIG. 1, the preferred system in which the present invention would be applied consists of the central processing unit 11 incorporating a high-performance computer, and of many autonomous verification units 14 (e.g. ATM machines, security check points) equipped with inexpensive processing devices.

A contour image template (signature template) 20 is acquired from the input device 10, which is capable to capture both spatial and time-domain coordinates of the input signals, so that the dynamic description of the contour image template 20 can be memorized in the central processing unit 11. The dynamic description of the contour image template is a time-dependent vector function $(x(t),y(t))$ being represented by a sequence $\{(x(i),y(i)): i=1, 2, \ldots N\}$.

The signature template 20 is processed in the central processing unit 11 so that it is being, segmented and then selective parameters and features 21 are computed. The parameters and features 21 are memorized onto a magnetic card/portable memory device 12 prior to issuing to a customer.

In a verification unit 14, incoming signatures are acquired from the input device 13, which is capable (similarly to the input device 10) to capture both spatial and time-domain coordinates of the input signals so that the dynamic descriptions of incoming signatures (contour images) 22 can be memorized in the verification unit 14. Similarly, the dynamic description of an incoming signature is a time-dependent vector function $(x(t),y(t))$ being represented by a sequence $\{(x(k),y(k)): k=1, 2, \ldots, M\}$.

When the magnetic card/portable memory device 12 is inserted/connected to the verification unit 14, the parameters and features 21 of the signature template can be retrieved and used to process and verify/authenticate incoming, signatures 22. First, an incoming contour image 22 is normalized and segmented according to the retrieved parameters. Then, the retrieved features are compared to the features calculated for the segmented incoming contour image 22, the features retrieved from a magnetic card/portable memory device. The decision 23 (acceptance or rejection of the incoming signature) is based on the overall similarity between the retrieved features and the calculated ones.

Figure 2:
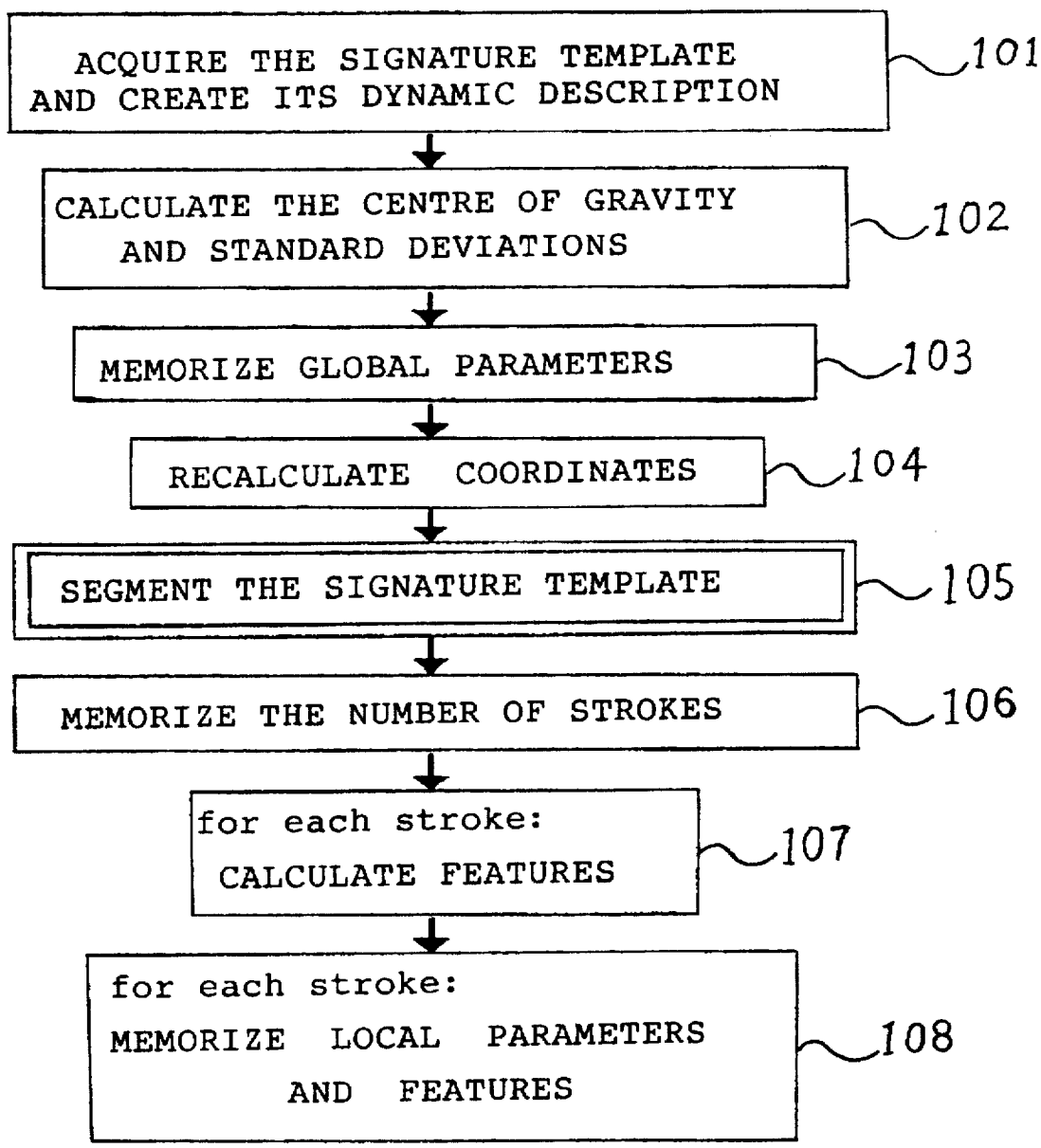
FIG. 2 is a flowchart illustrating in a broad sense the steps performed in processing and segmenting a binary contour image template.

Referring to FIG. 2, the algorithm performed in the central processing unit comprises the following steps:

Step 101 Acquire a signature template from the input device 10 and create the dynamic description $\{(x(i),y(i)): i=1, 2, \ldots, N\}$.

Step 102 Calculate the coordinates centre of gravity (x_bar, y_bar), the horizontal standard deviation X_dev, and the vertical standard deviation Y_dev of the signature template, where $$x\_bar = \frac{1}{N} \sum_{i=1}^{N} x(i)$$

$$y\_bar = \frac{1}{N} \sum_{i=1}^{N} y(i)$$

$$X\_dev = \sqrt{\frac{1}{N} \sum_{i=1}^{N} (x(i) - x\_bar)^2}$$

$$Y\_dev = \sqrt{\frac{1}{N} \sum_{i=1}^{N} (y(i) - y\_bar)^2}$$

Step 103 Memorize into the magnetic card/portable memory device 12 the following global parameters:

the length of the signature template N;

the horizontal standard deviation X_dev of the signature template;

the vertical standard deviation Y_dev of the signature template.

Step 104 Recalculate the coordinates (x(i),y(i)) using the origin of coordinates translated to the centre of gravity (x_bar, y_bar) so that x(i) becomes x(i)-x_, and y(i) becomes y(i)-y_bar.

Step 105 Segment the signature template into a sequence of strokes using, selective properties of the discrete cosine transform (DCT) calculated for the vectors {x(i)} and {y(i)}. Each extracted stroke $S_p$ represented by a sequence $\{(x(i), y(i)): i=init(p), init(p)+1, init(p)+2, \ldots, term(p)\}$. DCT can be substituted by any mathematical transformation of similar properties (e.g. discrete Fourier transform, Walsh-Hadamard transform, discrete sine transform, Slant transform, Haar transform, etc.).

Step 106 Memorize into the magnetic card/portable memory device 12 the number of extracted strokes NS.

Step 107 For each extracted stroke $S_p=\{(x(i),y(i)): i=init(p), init(p)+1, \ldots, term(p)\}$ calculate selective features describing static shape properties and selective features describing dynamic shape properties. In the preferred embodiment the following features are proposed but this is given by way of illustration and example only:

features describing static shape properties:
the coordinates of the centre of gravity (xp_bar, yp_bar);
the orientation of the major axis θp;

features describing dynamic shape properties:

the relative position vector (Xp, Yp);

where $$xp\_bar = \frac{1}{term(p) - init(p) + 1} \sum_{i=init(p)}^{term(p)} x(i)$$

$$yp\_bar = \frac{1}{term(p) - init(p) + 1} \sum_{i=init(p)}^{term(p)} y(i),$$

$$Xp = \frac{1}{term(p) - init(p)} \sum_{i=init(p)}^{term(p)} |x(i) - x(init(p))|,$$

$$Yp = \frac{1}{term(p) - init(p)} \sum_{i=init(p)}^{term(p)} |y(i) - y(init(p))|.$$

The formula defining orientation of the major axis is well known, and can be found in the relevant literature (e.g. A. K. Jain "Fundamentals of Digital Image Processing", 1989, by Prentice-Hall—chapter 9.10).

Step 108 For each extracted stroke $S_p$ memorize into the magnetic card/portable memory device 12 the following segmentation parameters:

location of the initial point init(p) of the stroke;
location of the terminal point term(p) of the stroke;

and the following features:

the coordinates of the centre of gravity (xp_bar, yp_bar);
the orientation of the major axis θp;
the relative position vector (Xp, Yp).

The abovementioned features are given by way of illustration and example only and are not to be taken by way of limitation, so that in the future embodiments other features could be calculated for the extracted strokes and memorized into the magnetic card/portable memory device 12.

Figure 3:
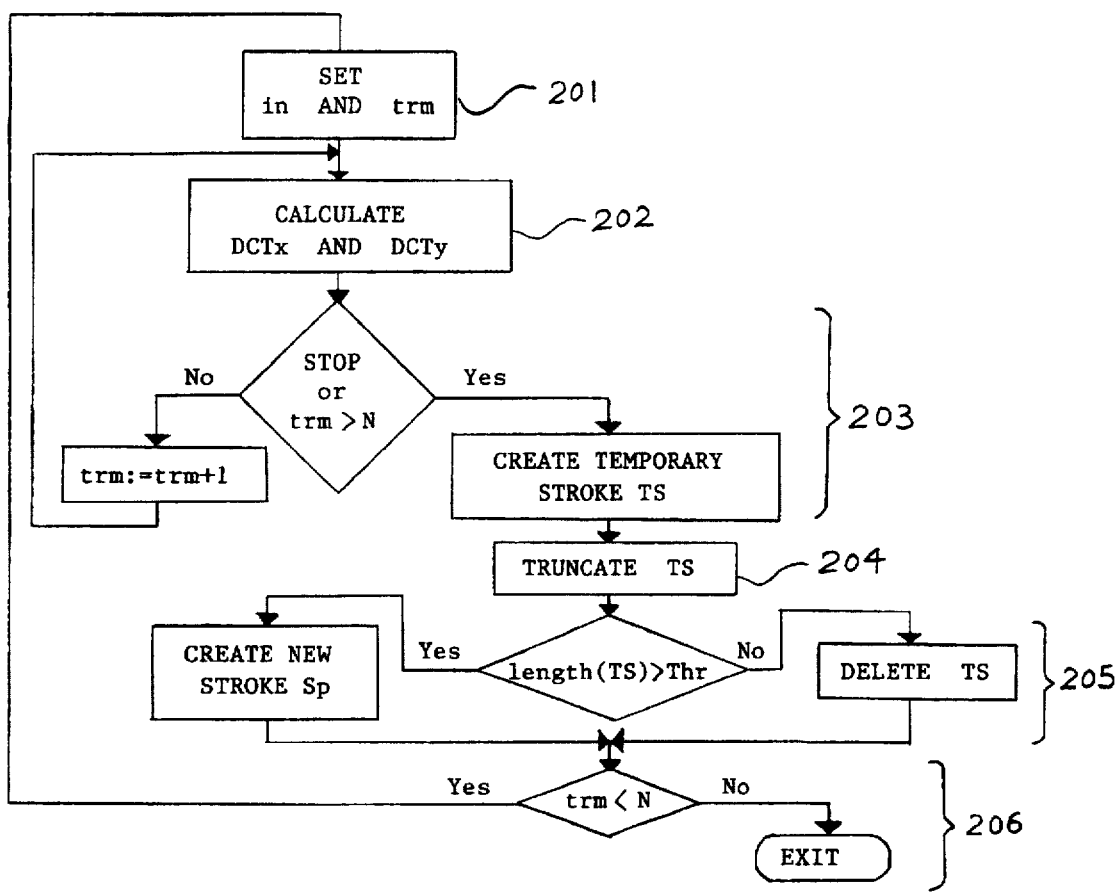
FIG. 3 is a flowchart illustrating details of the selected step (image segmentation) of FIG. 2.

The most complex calculation are performed in Step 105 of FIG. 2 (segmentation of the signature template into strokes). In general, a stroke is a sequence of consecutive points starting from the beginning of the currently existing contour. The length of a stroke is gradually increased until the discrete cosine transform (DCT) for the stroke fulfills certain STOP conditions. In the preferred embodiment, the STOP condition (given by way of illustration and example only and not to be taken by way of limitation) is that the normalized DCT has a non-zero fourth (or higher) coefficient. Therefore, referring to FIG. 3, the step 105 of FIG. 2 is performed using the following algorithm:

Step 201 Set the initial point (x(in),y(in)) in the first point of the contour. Originally the contour is the whole signature template $\{(x(i),y(i)): i=1, 2, \ldots, N\}$, so that in=1. Set the terminal point (x(trm),y(trm))=(x(in+1),y(in+1)).

Step 202 Calculate the discrete cosine transform (DCT) for the vectors {x(in), . . . , x(trm)} and {y(in), . . . , y(trm)}, and normalize the calculated DCTs using predetermined normalizing multipliers. Denote the results as DCTx and DCTy, respectively.

Step 203

---

If the STOP condition is fulfilled for DCTx and DCTy, or trm>N
then
    create a new temporary stroke TS from the point (x(in),y(in)) to the point (x(trm-1),y(trm-1));
    delete the points $\{(x(in),y(in)), \ldots, (x(trm-1),y(trm-1))\}$ from the contour;
    goto Step 204.
else
    increase the position of the terminal point, i.e. trm=trm+1;
    goto Step 202.

---

Step 204 Truncate the temporary stroke TS. In the preferred embodiment, the initial 10% of points and the terminal 10% of points would be deleted, but this is given by way of illustration and example only.

Step 205

---
If the truncated stroke TS is longer the a predetermined threshold
then
    create a new stroke $S_p$ from the truncated temporary stroke TS;
    set init(p) as the number of the first point of $S_p$;
    set term(p) as the number of the terminal point of $S_p$;
else
    delete the temporary stroke TS.

---

Step 206

---
If trn<N
    then
        goto Step 201;
    else
        exit.

---

Figure 4:
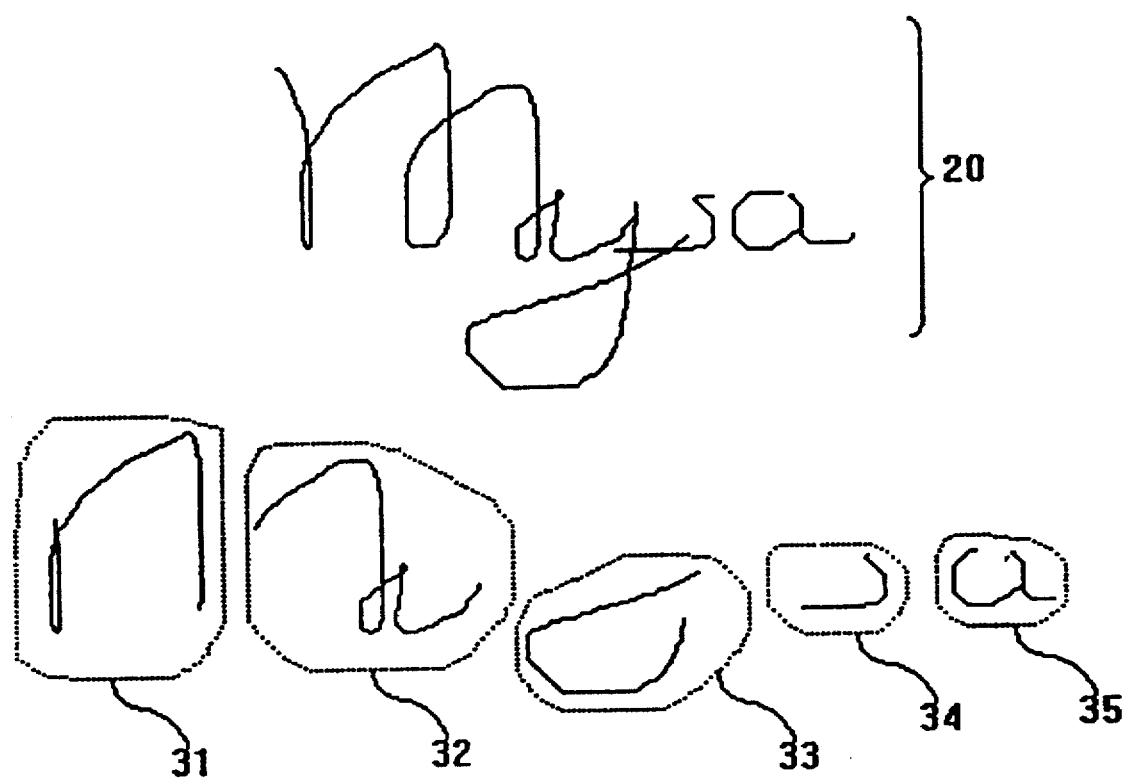
FIG. 4 shows an example of a binary contour image template (signature template) and the results of segmentation performed in the central processing unit.

FIG. 4 shows an example of a template contour image (signature template) 20 and the strokes 31, 32, 33, 34, 35 extracted by the algorithm performed in the central processing unit 11.

When the magnetic card/portable memory device 12 is inserted/connected to the verification unit 14, the parameters and features 21 of the signature template can be retrieved and used to normalize, segment and verify/authenticate incoming signatures 22.

Figure 5:
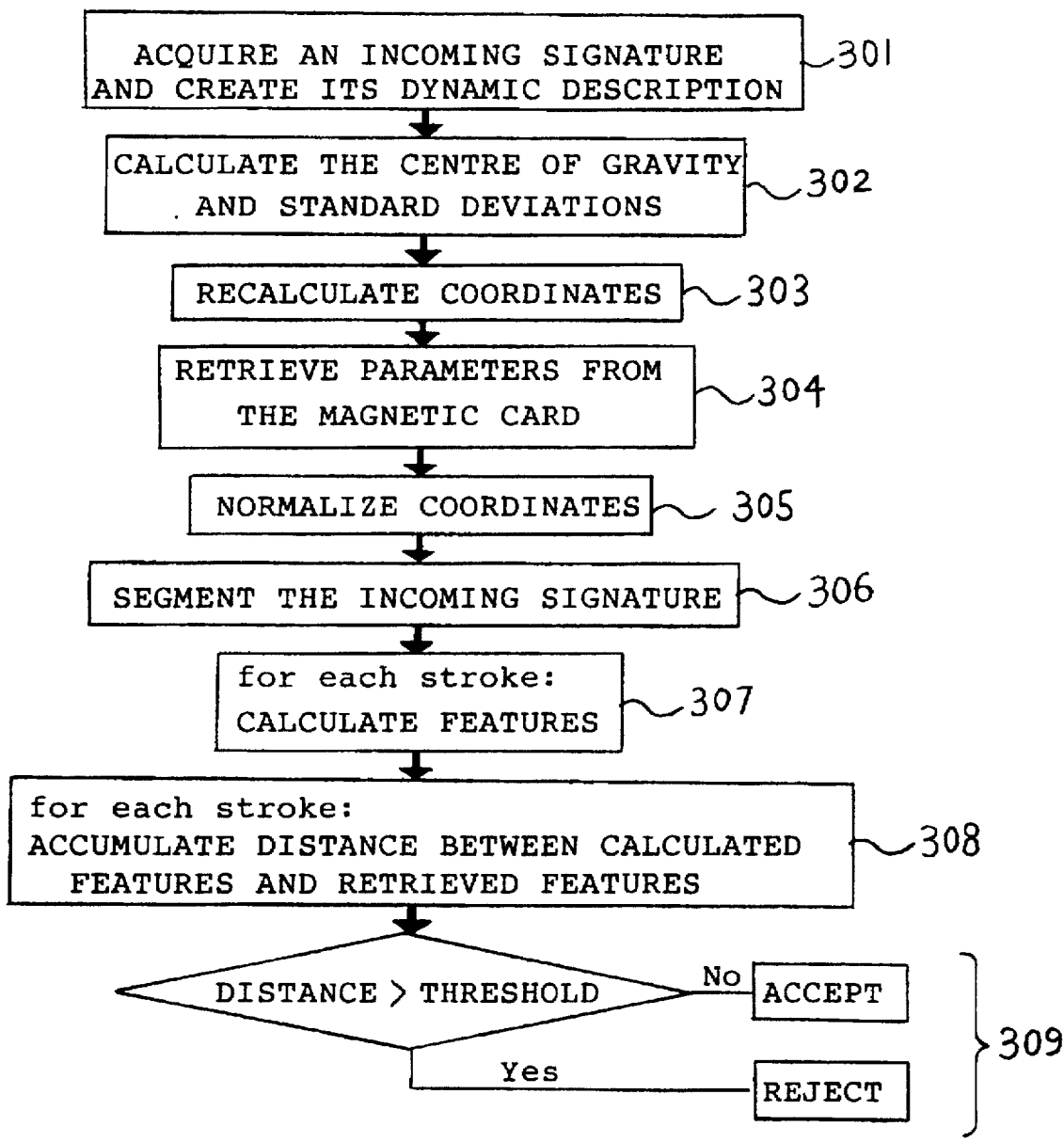
FIG. 5 is a flowchart illustrating in a broad sense the steps performed in processing and segmenting incoming binary contour images.

Referring to FIG. 5, the algorithm performed in the verification unit 14 comprises the 20 following steps:

Step 301 Acquire an incoming signature from the input device 13 and create the dynamic description {(x(k),y(k)): k=1, 2, . . . , M}.

Step 302 Calculate the centre of gravity (xi__bar,yi__bar), the horizontal standard deviation XI__dev, and the vertical standard deviation YI__dev of the incoming signature.

Step 303 Recalculate the coordinates (x(k),y(k)) using the origin of coordinates translated to the centre of gravity (xi__bar,yi__bar) so that x(k) becomes x(k)−xi__bar, and y(k) becomes y(k)−yi__bar.

Step 304 Retrieve from the magnetic card/portable memory device 12 the following parameters of the signature template:

the length of the signature template N;

the horizontal standard deviation X__dev of the signature template;

the vertical standard deviation Y__dev of the signature template;

the number of extracted strokes NS numbers of the initial points init(p) for all strokes of the signature template;

numbers of the terminal points term(p) for all strokes of the signature template.

Step 305 Normalize the coordinates (x(k),y(k)) so that the horizontal standard deviation XI__dev equals X__dev, and the vertical standard deviation YI__dev equals Y__dev.

Step 306 Segment the incoming signature into NS strokes. For each stroke $S_p$ of the signature template, the corresponding stroke $SI_p$ of the incoming signature would have the number of the initial point init1(p)=init(p)*M/N and the number of the terminal point term1(p)=term(p)*M/N.

Step 307 For each stroke $SI_p$={(x(k),y(k)): k=init1(p), init1(p)+1, . . . , term1(p)} calculate the features defined in Step 107.

Step 308 For each stroke $SI_p$ of the incoming signature accumulate the weighted distance between the features calculated in Step 307 and the corresponding features (which are retrieved from the magnetic card/portable memory device 12) of the corresponding stroke $S_p$ of the signature template.

Step 309

---
If the accumulated distance exceeds the predetermined threshold value
    then
        reject the incoming signature;
    else
        accept the incoming signature.

---

Since the segmentation of incoming signatures is controlled by the parameters which have been retrieved from the magnetic card/portable memory device 12 (i.e. they have been extracted from the signature template) the strokes created within an incoming signature are similar to the corresponding strokes of the signature template only if the two signatures are similar. Otherwise, the extracted strokes would have different shapes and, therefore, the features computed in Step 307 would differ significantly from the corresponding features of the signature template, so that the incoming signature would be rejected. Examples are given in FIGS. 6 and 7 wherein the incoming signatures 22 are authenticated with the signature template 20 of FIG. 4.

Figure 6:
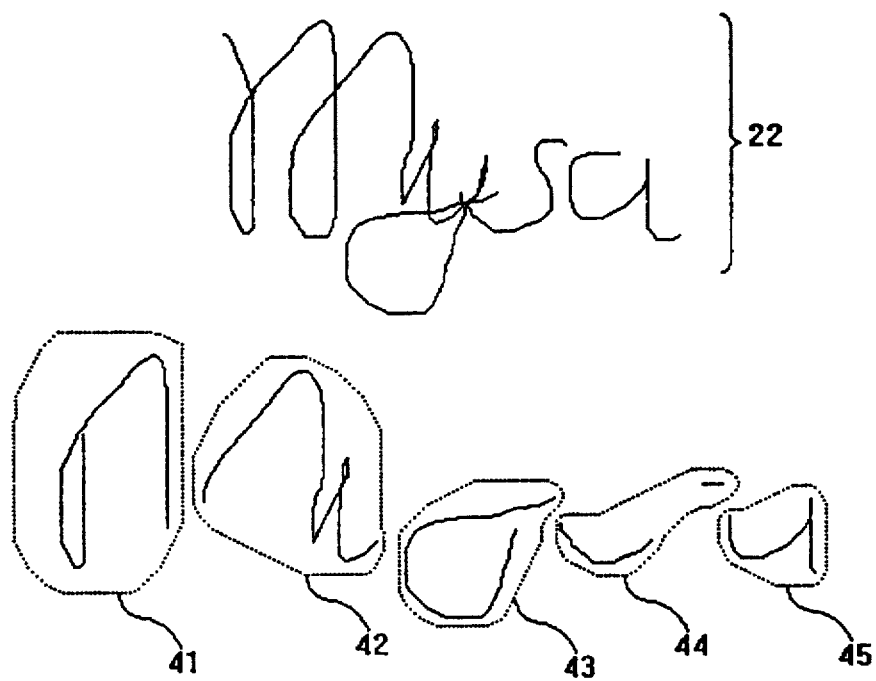
FIG. 6 shows an example of an incoming signature being, similar to the template of FIG. 4, and the results of segmentation performed in a verification unit using the parameters extracted from the template of FIG. 4.

Referring to FIG. 6, the shapes of strokes 41, 42, 43, 44 and 45 closely resemble the shapes of the corresponding strokes 31, 32, 33, 34, 35 so that the incoming signature would be accepted.

Figure 7:
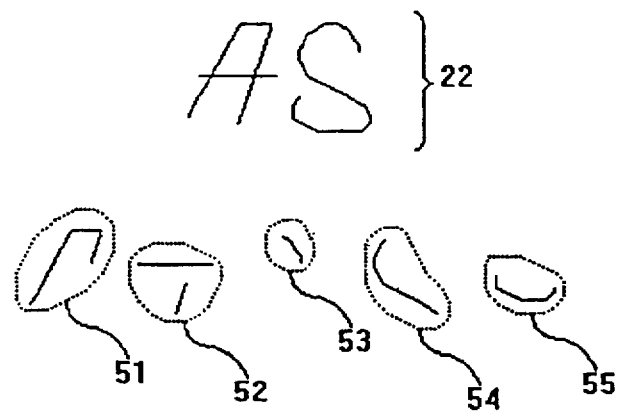
FIG. 7 shows an example of an incoming, signature being not similar to the template of FIG. 4, and the results of segmentation performed in a verification unit using the parameters extracted from the template of FIG. 4.

Referring to FIG. 7, the shapes of strokes 51, 52, 53, 54 and 55 significantly different than the corresponding strokes 31, 32, 33, 34, 35 so that the incoming signature would be rejected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for the development of an image template from a template contour image for authentication and identification of incoming unknown contour images comprising:

(i) acquiring spatial and time domain information of said template contour image;

(ii) performing discrete cosine transform or orthogonal transform of the template contour image information;

(iii) computing a sequence of global parameters of said template contour image information, and dividing said template contour image into a plurality of of strokes according to segmentation parameters computed according to predetermined properties of said discrete cosine transform or orthogonal transform;

(iv) computing a sequence of feature measurements for each of said plurality of strokes;

(v) generating said image template from said global parameters, said segmentation parameters, and said feature measurement; and (vi) storing said image template in an external portable memory device.

2. A method for the authentication and identification of randomly incoming contour images with an image template developed according to the method of claim 1 comprising:

(i) acquiring spatial and time domain information of an incoming contour image;

(ii) retrieving from said external portable memory devices the stored image template consisting of global parameters, segmentation parameters, and feature measurement;

(iii) determining rules, conditions, and algorithms for the development of said incoming contour image in accordance with said retrieved global parameters, segmentation parameters, and feature measurements;

(iv) performing normalization of said incoming contour image according to said retrieved global parameters;

(v) dividing said incoming contour image into a plurality of strokes according to said retrieved segmentation parameters;

(vi) computing said sequence of feature measurements for each of said plurality of strokes;

(vii) computing the distance between each of said feature measurements, and the corresponding feature measurement retrieved from said external portable memory devices, and accumulating said distance; and (viii) determining the authentication and verification of said incoming contour image with said image template, wherein said incoming contour image is accepted if the accumulated said distance satisfies a predetermined similarity criterion, and otherwise said incoming contour image is rejected.

3. A system for computing selective feature measurements for an image template and for incoming image as set forth in claim 2, wherein the six step additionally comprises:

(i) computing the selective features describing properties determined by spatial coordinates of pixels for each of said plurality of strokes; and (ii) computing the selective features describing properties determined by spatial and time-domain coordinates of pixels for each of said plurality of strokes.

4. A system for computing selective global parameters and segmentation parameters for image template as set forth in claim 1, wherein the third step additionally comprises:

(i) computing the total number of pixels of said template contour image;

(ii) computing the centre of gravity of said template contour image and introducing the system of coordinates with the origin defined by said centre of gravity for achieving location invariance;

(iii) computing the horizontal standard deviation and the vertical standard deviation of said template contour image for achieving size invariance;

(iv) computing the number of strokes within said plurality of strokes extracted from said template contour image; and (v) computing the numbers of pixels and location within said template contour image for each of said plurality strokes.

5. A system for computing selective feature measurements for an image template and for incoming image as set forth in claim 1, wherein the fourth step additionally comprises:

(i) computing the selective features describing properties determined by spatial coordinates of pixels for each of said plurality of strokes; and (ii) computing the selective features describing properties determined by spatial and time-domain coordinates of pixels for each of said plurality of strokes.

* * * * *